United States Patent [19]
Schueler

[11] Patent Number: 5,199,525
[45] Date of Patent: Apr. 6, 1993

[54] CONTROL CIRCUIT FOR HYDROSTATIC ALL WHEEL DRIVE VEHICLE

[75] Inventor: Robert A. Schueler, Oconomowoc, Wis.

[73] Assignee: Ransomes Inc., Johnson Creek, Wis.

[21] Appl. No.: 746,049

[22] Filed: Aug. 12, 1991

Related U.S. Application Data

[63] Continuation of Ser. No. 421,616, Oct. 13, 1989, abandoned.

[51] Int. Cl.$^5$ ............................................. B60K 17/356
[52] U.S. Cl. ..................................... 180/242; 180/308; 60/425; 60/468
[58] Field of Search ............... 180/233, 242, 245, 305, 180/308, 243; 60/468, 425

[56] References Cited

U.S. PATENT DOCUMENTS

| | | | |
|---|---|---|---|
| 3,972,186 | 8/1976 | Humphreys et al. | 60/425 |
| 4,402,377 | 9/1983 | Brooks et al. | 180/242 X |
| 4,484,655 | 11/1984 | Sheppard | 180/305 X |
| 4,579,044 | 4/1986 | Johnson | 60/425 X |

Primary Examiner—Margaret A. Focarino
Assistant Examiner—Anne Marie Boehler
Attorney, Agent, or Firm—Reinhart, Boerner, Van Deuren, Norris & Rieselbach

[57] ABSTRACT

A hydrostatic drive system having valving which disengages power to selected drive wheel motors in response to a sensed lack of traction, while the driven vehicle is in motion. The valving also allows communication of fluid between the inlet port of one drive wheel motor and the outlet port of another, in response to the decoupling of one of the motors in order to prevent an abrupt transition.

5 Claims, 6 Drawing Sheets

CONTROL CIRCUIT FOR HYDROSTATIC ALL WHEEL DRIVE VEHICLE

This is a continuation of copending application Ser. No. 07/421,616 filed on Oct. 13, 1989, now abandoned.

The present invention is concerned generally with a control circuit for a hydrostatic drive system for a vehicle. More particularly, the invention is directed to a control circuit for a hydrostatic drive system having a sensor which engages or disengages power to selected wheel drive motors while the driven vehicle is in motion and without any sudden stoppage of the wheel drive motor and associated wheel. Any sudden stoppage of a wheel drive motor can cause damage to the terrain, such as by a wheel scuffing action, and under some circumstances sudden stoppage can result in loss of vehicle control.

Conventional hydrostatic drive systems for vehicles include front and rear wheel drive motors to provide independent power output for driving the front and rear drive wheels. Vehicles having such hydrostatic drive systems often are operated under strenuous conditions, such as traversing rolling or steep terrain or undergoing rapid acceleration and deceleration. In such situations the weight distribution of the vehicle can rapidly shift between the front drive wheels and the rear drive wheels. These various conditions lead to a vehicle having a tendency to lose wheel traction, exhibit inefficient power usage and also result in unsafe operating conditions for the vehicle. There have been attempts to alleviate this problem by disengaging selected drive wheel motors, but these attempted solutions have resulted in several problems: (1) disengagement could not be achieved automatically while the vehicle was in motion and (2) abrupt changes in the hydrostatic fluid flow to wheel drive motors cause a scuffing, or momentary braking, action by the drive wheels. The inability to perform automatic disengagement while in motion results in loss of traction and inefficient use of power. In regard to the scuffing action, it can damage the underlying turf, can instigate unsafe reflex actions by the driver of the vehicle and can cause loss of power which is more efficiently used for driving the remaining engaged wheel drive motors.

It is therefore an object of the invention to provide an improved hydrostatic drive circuit for a vehicle.

It is another object of the invention to provide a novel control circuit for a vehicle with a hydrostatic drive system.

It is an additional object of the invention to provide an improved device for automatically engaging and disengaging power to selected drive wheels of a hydrostatic drive circuit of a vehicle which is in motion.

It is a further object of the invention to provide an improved spring loaded valve for smoothly engaging and disengaging power to a selected wheel drive motor of a hydrostatic drive system for a vehicle which is in motion.

It is another object of the invention to provide a novel method of operating a hydrostatic drive system of a vehicle to selectively engage and disengage a wheel drive motor without an abrupt change of the flow of hydrostatic fluid.

Further objects and advantages of the present invention, together with the organization and manner of operation thereof, will become apparent from the following detailed description of the invention when taken in conjunction with the accompanying drawings wherein like reference numerals designate like elements in the several views.

DETAILED DESCRIPTION OF PREFERRED EMBODIMENTS

Figure 1:
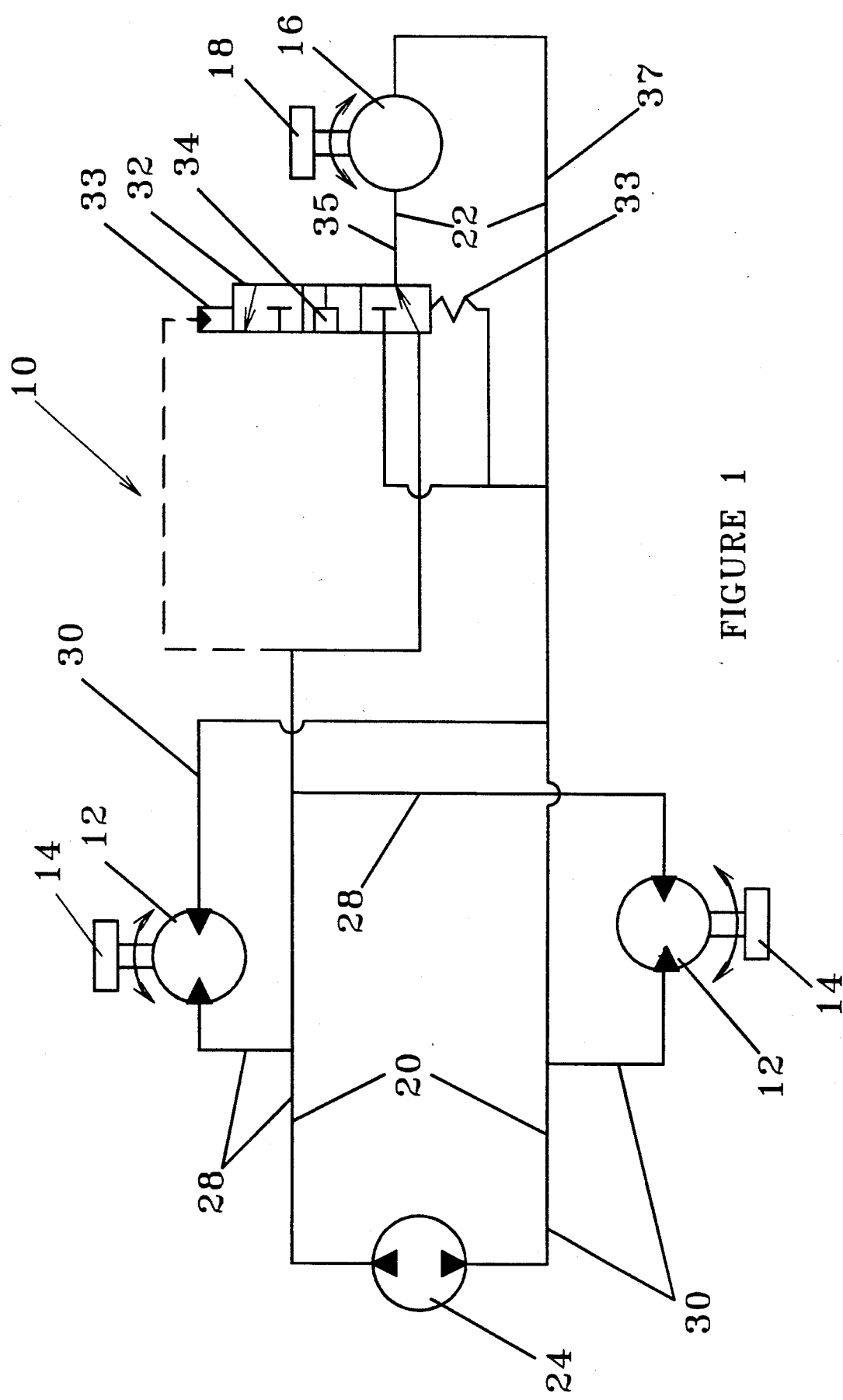
FIG. 1 illustrates a hydrostatic drive circuit constructed in accordance with the invention.
Figure 2A:
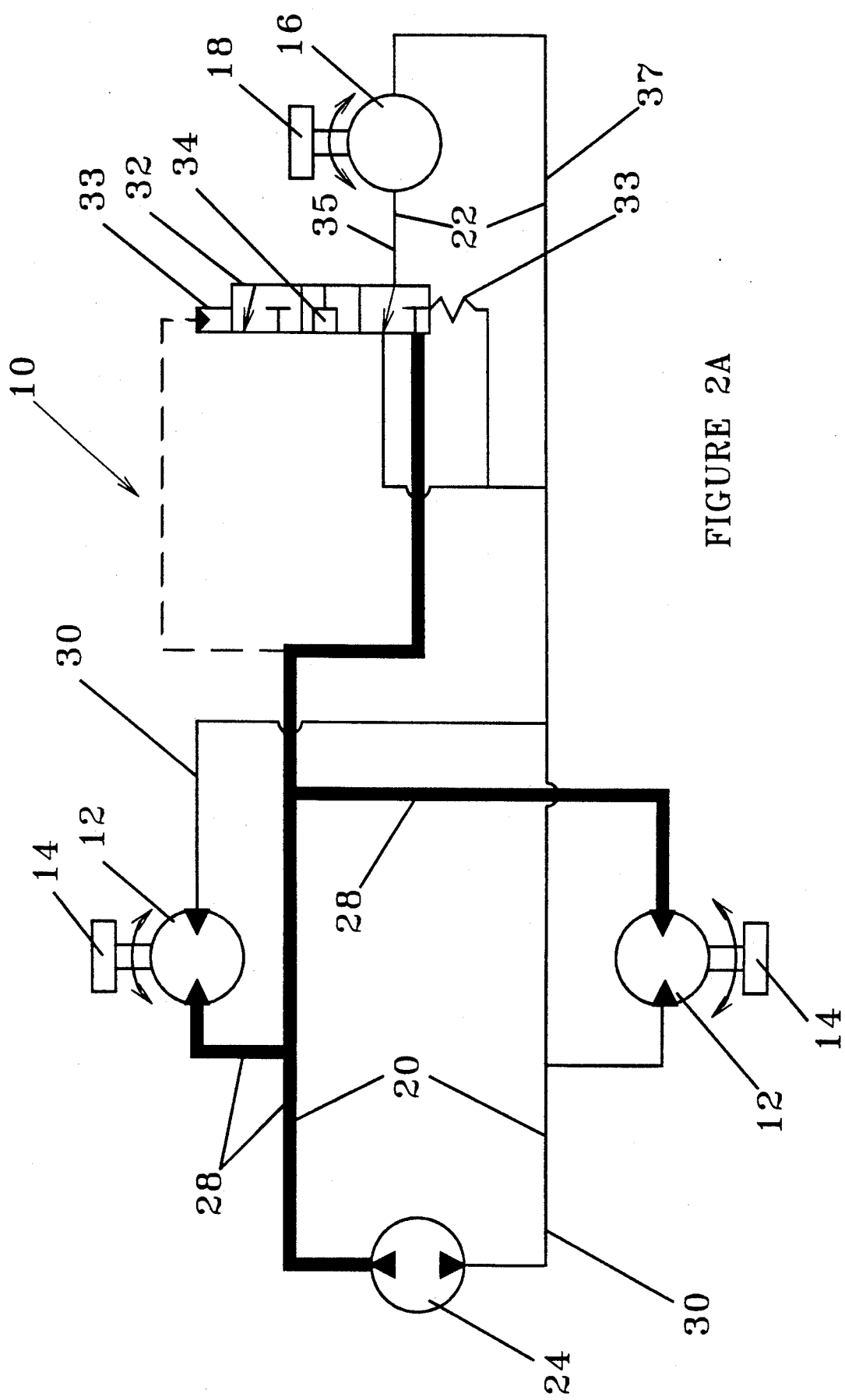
FIG. 2A illustrates a hydrostatic drive system operating with a control circuit feature activated.
Figure 2B:
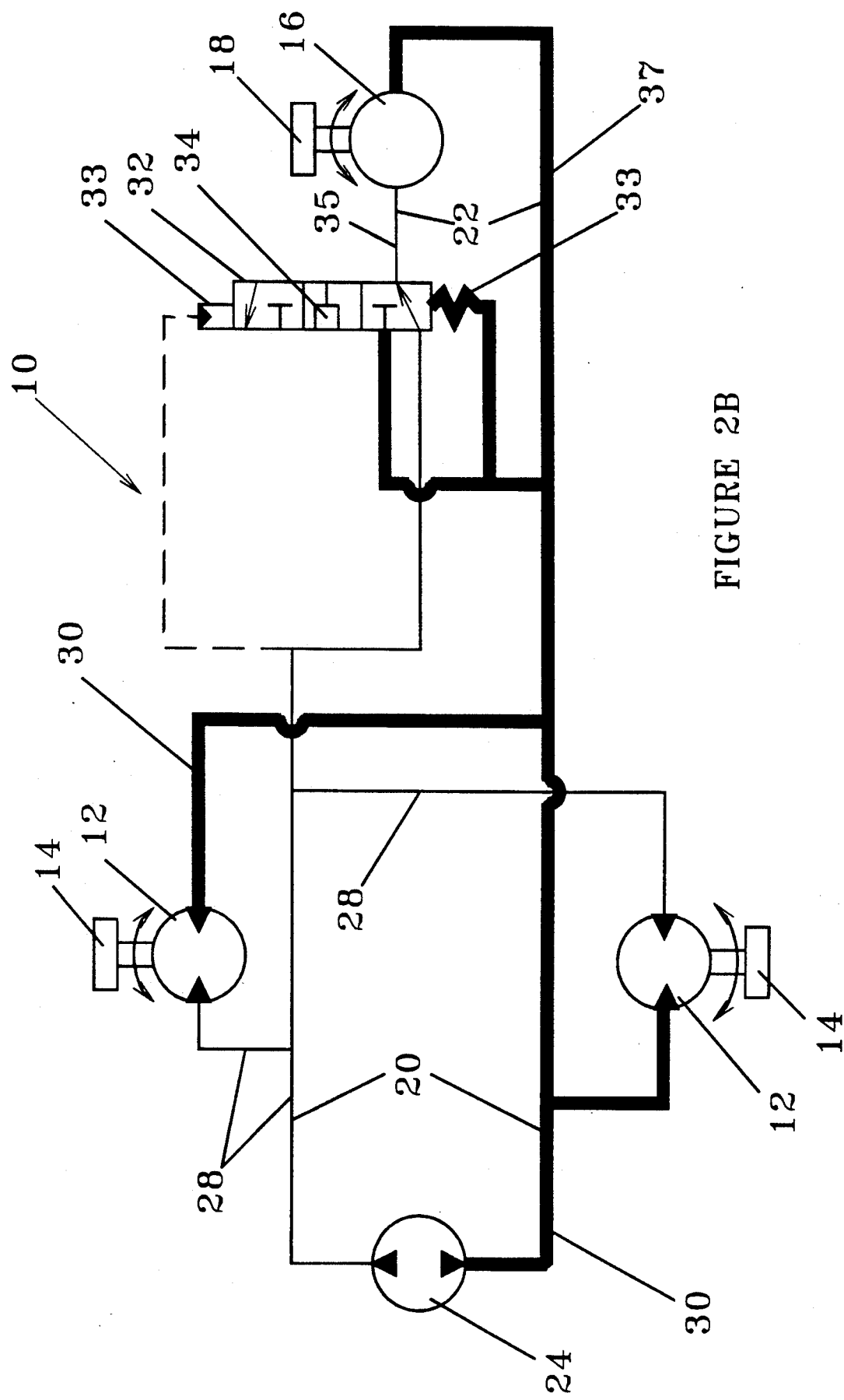
FIG. 2B shows the hydrostatic drive circuit with the control circuit deactivated.

Referring now to the drawings and in particular to FIG. 1, an improved hydrostatic drive circuit constructed in accordance with one embodiment of the invention is indicated at 10. The hydrostatic drive circuit 10 provides power in a conventional manner to an all wheel drive vehicle (see, for example, U.S. Pat. Nos. 3,865,207 and 3,913,453 incorporated by reference herein). Power is provided to a front wheel drive motor 12 which drives front drive wheels 14, and a rear wheel drive motor 16 drives a rear drive wheel 18. Drive motors 12 and 16 provide pressurized hydrostatic fluid through a front hydrostatic line 20 and a rear hydrostatic line 22, respectively. The hydrostatic fluid is provided by a conventional bidirectional pump 24 which operates to pump the hydrostatic fluid to the wheel drive motors 12 and 16. The fluid is pumped along a reverse portion 28 or a forward portion 30 of the front hydrostatic line 20 to achieve reverse or forward motion, respectively, of the vehicle (not shown). For example, in FIG. 2B the hydrostatic drive circuit 10 is being operated in the forward drive mode. In FIG. 2A, the circuit 10 is being operated in the reverse drive mode, but power has been automatically disengaged to the rear wheel drive motor 16. In the forms of the invention a number of monodirectional pumps can also be used with directional valves used for splitting fluid flow into the reverse and forward portions of the hydrostatic lines 20, 22.

Since power is normally provided to both the front drive wheels 14 and the rear drive wheels 18, traction should nominally be available for all the drive wheels. While an all wheel drive vehicle provides advantages in operation and handling, terrain conditions, and general driving conditions can lead to undesirable consequences. For example, the typical all wheel drive vehicle has uneven weight distribution between the front and rear wheels. Therefore, as the vehicle responds to the terrain conditions, or is accelerated or decelerated due to the actions of the driver, substantial changes in wheel weight distribution can lead to loss of wheel traction.

In order to optimize traction and power usage and to avoid difficult operating conditions for the vehicle, the hydrostatic drive circuit 10 is responsive to a control circuit 32. The control circuit 32 utilizes any conventional hydrostatic pressure sensor 33 (e.g., a pressure transducer for solenoid valves to move hydrostatic fluid valves; an air sensor to sense pneumatically various pressure changes). The preferred sensor 33 in the figures includes a spring biased against a valve portion 36' of a spool 38 and a sampling pressure $P_p$ inlet with the pressure urging a valve portion 36" opposite the spring bias force F. The pressure $P_p$ arises from sampling the hydrostatic fluid pressure as influenced by the changing weight distribution on the rear drive wheel 18. The torque seen by the rear drive wheel 18 is therefore influenced by the weight on the wheel 18. Thus, for example, no torque can be generated if the wheel 18 is not in contact with the surface. When the sensor 33 detects a pressure $P_p$ which is above or below a predetermined pressure level, an appropriate predetermined wheel drive motor is therefore engaged or disengaged. That is, given the weight distribution of a particular all wheel drive vehicle, it is known that under certain driving conditions preselected ones of the drive motors (and associated drive wheels) should be disengaged. For example, as the vehicle encounters driving conditions which cause loss of traction for preselected drive wheels, the sensor 33 detects a change in hydrostatic fluid flow which results from a shift in weight; and an appropriate drive motor is disengaged. However, if the conditions then change such that traction is reestablished, the appropriate drive motor is re-engaged.

In the three wheeled embodiment of FIG. 1, the weight is assumed to be biased on the front drive wheels 14. The hydrostatic pressure sensor 33 detects the pressure associated with the change of weight distribution on the wheels. Note that the pressure can be sampled at any point along the hydrostatic pressure lines 20, 22. The general purpose of the hydrostatic pressure sensor 33 is therefore to sense the change in pressure in the hydrostatic pressure lines 20, 22 arising from the torque change described hereinbefore. This sensed pressure is then utilized to control engagement or disengagement of drive wheel motors in the manner described hereinbefore.

As a further specific illustration of the operation of the control circuit 32, if the operating conditions for an all wheel drive vehicle do give rise to a loss of traction on a selected drive wheel, the control circuit 32 is activated and power is disengaged to the selected drive wheel, (see FIG. 2A wherein power is removed from the rear wheel drive motor 16). In the case of FIG. 2A the vehicle weight is biased on the front drive wheels 14, and traction for the rear drive wheel 18 will be lost whenever the vehicle is accelerated backward or braked while the vehicle is going in a forward position. Such operating conditions cause a loss of traction, and it would be desirable to disengage power to the rear drive wheel 18. The control circuit 32 thus disengages power to the rear drive wheel 18 by valving off the flow of hydrostatic fluid on a forward portion side 37 of the rear hydrostatic line 22. In order to avoid complete stoppage of fluid flow during this disengagement process (a valve undergoes a switching process in the illustrated embodiment), an open center crossover 34 allows the hydrostatic fluid to continue flowing, causing connection of both sides of the rear wheel drive motor 16 to low pressure (Generally, one can also connect both high pressure sides, i.e., one seeks to achieve a common pressure between the two sides to keep the fluid flowing). While both sides are connected to a common low pressure, fluid flow is also substantially blocked to the wheel drive motor 16 from the high pressure side of the hydrostatic drive circuit 10. Therefore, as shown in FIG. 4 the port openings B and C are somewhat restricted such that one avoids complete loss of hydrostatic pump pressure; for example, one avoids a direct short between the low and high pressure sides through ports B and C.

Figure 3A:
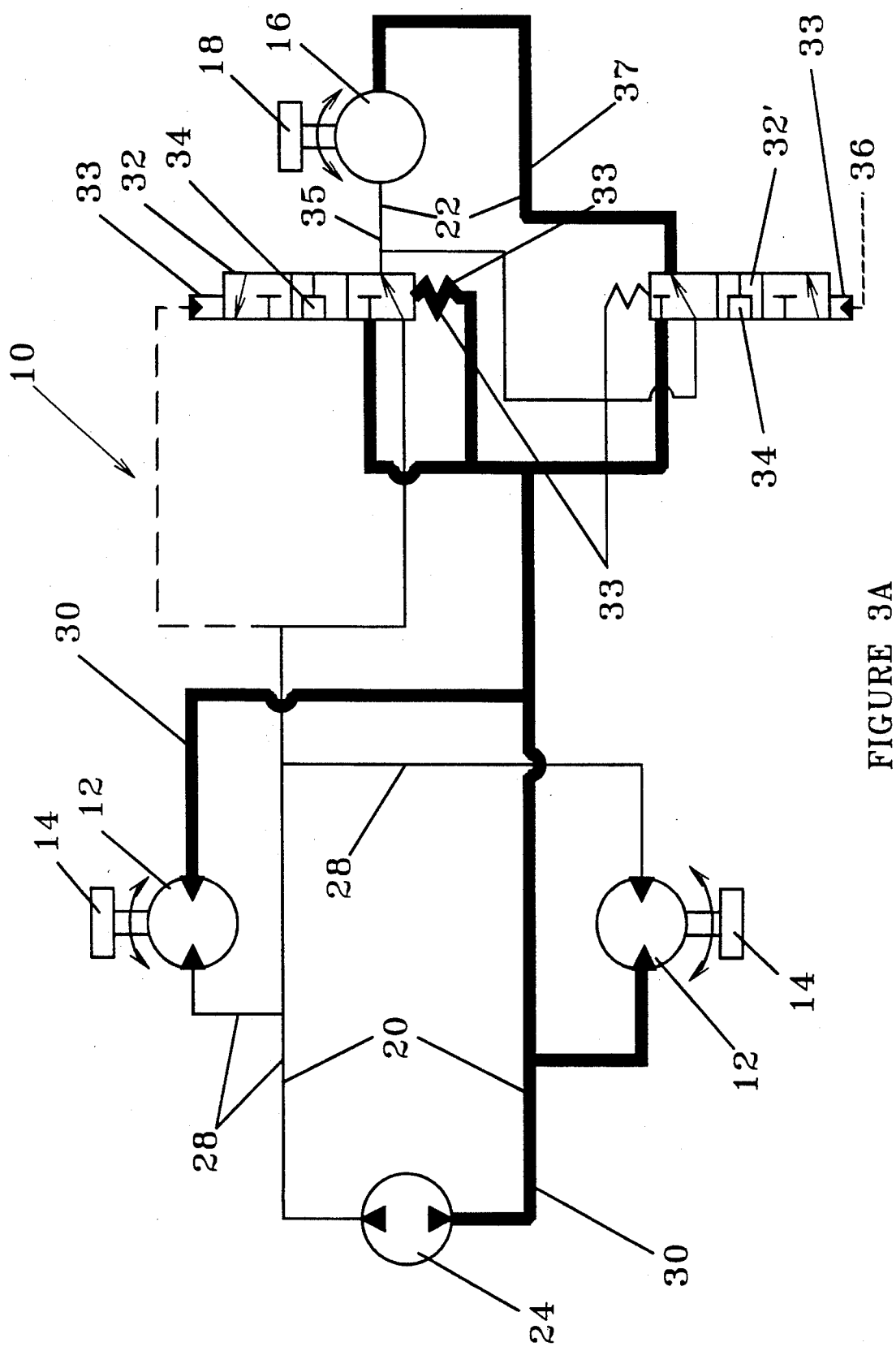
FIG. 3A illustrates a hydrostatic drive circuit with an additional two-speed control circuit in an activated state.
Figure 3B:
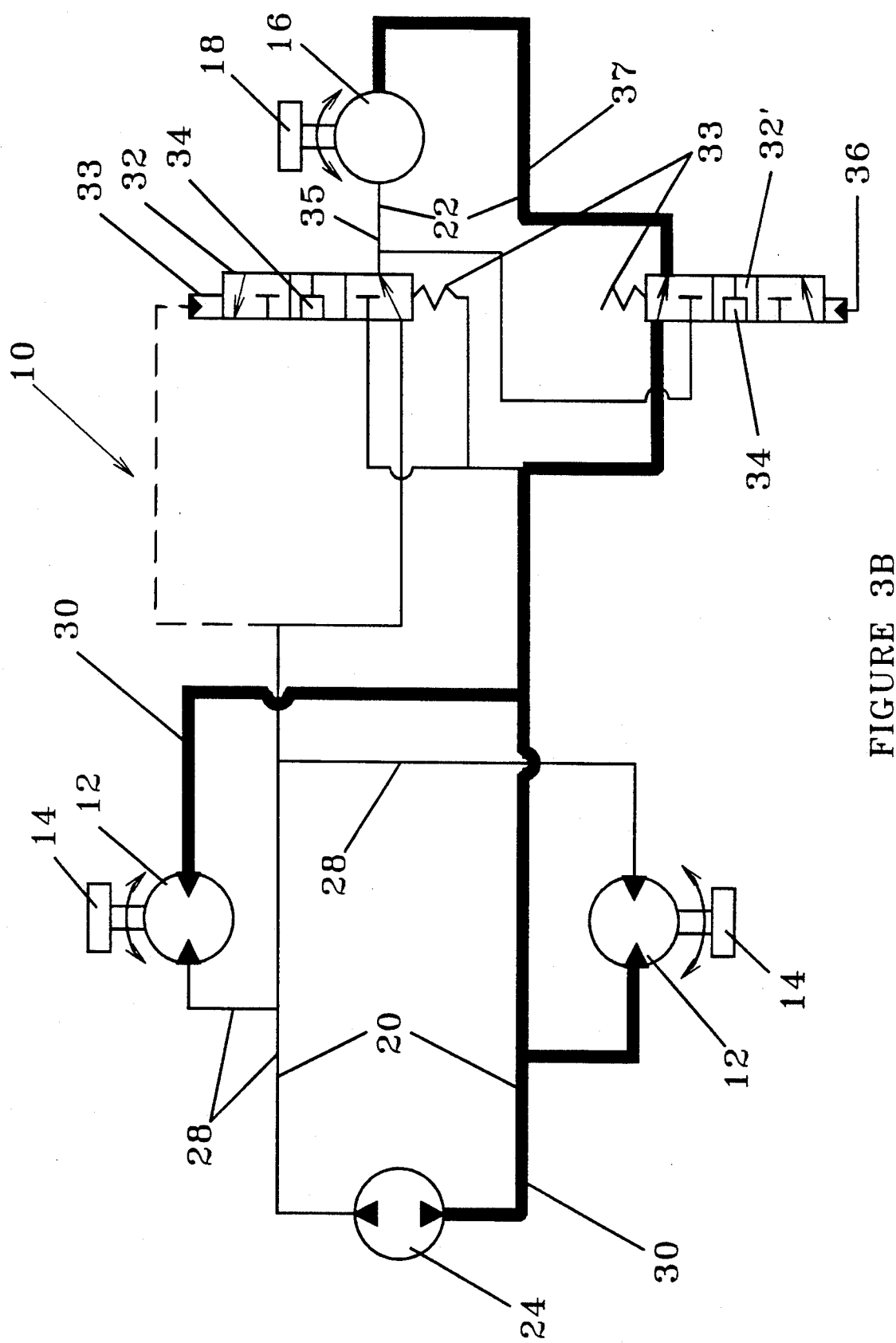
FIG. 3B shows the control circuit deactivated.
Figure 4A:
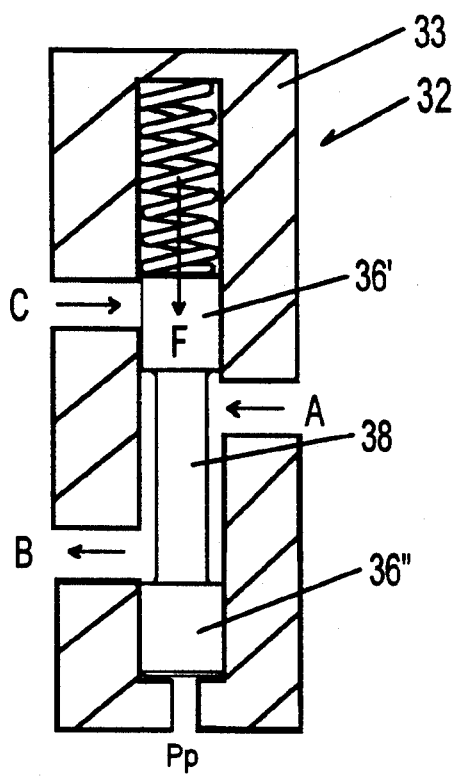
FIG. 4A shows the details of a valved control circuit with the drive circuit operating in reverse drive for all wheels.
Figure 4B:
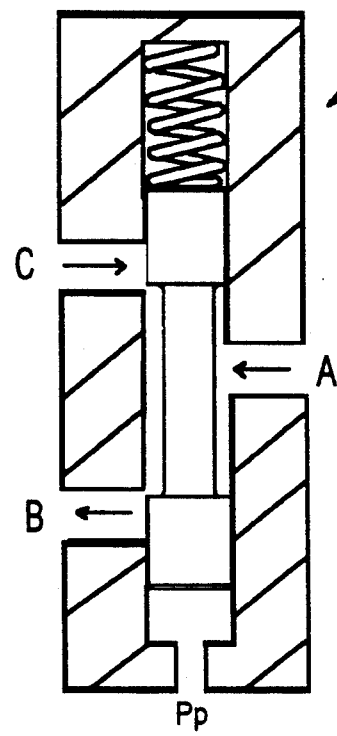
FIG. 4B illustrates the crossover open center state for the control circuit valve.

In FIG. 4 is shown the details of the disengagement operation as carried out by the sensor 33 and the valve 36. In FIG. 4A, the spring bias force F opposes movement of a spool 38 having the valve portions 36' and 36". The sampled hydrostatic fluid pressure $P_p$ is not large enough to overcome the spring force F. Thus, fluid flows from the outlet of the drive motor through the valve 36 to the reverse side of the bidirectional pump 24 (the low pressure side) and completes the closed loop in the drive circuit 10. As shown in FIG. 4B when the sampled pressure $P_p$ rises sufficiently to overcome the spring force F, the spool 38 moves in the direction of the spring sensor 33. As illustrated in FIG. 4B, at a selected position for the spool 38 and the coupled valve portions 36' and 36", all three of the ports A, B and C are open simultaneously. This corresponds to the open center crossover state indicated generally at 34 in FIGS. 1-3. As described above, this connects both sides of the drive motor to low pressure enabling its continued rotation. Therefore, fluid is returned through the valve 36 to whatever side of the bidirectional pump 24 has the lowest hydrostatic fluid pressure.

Figure 4C:
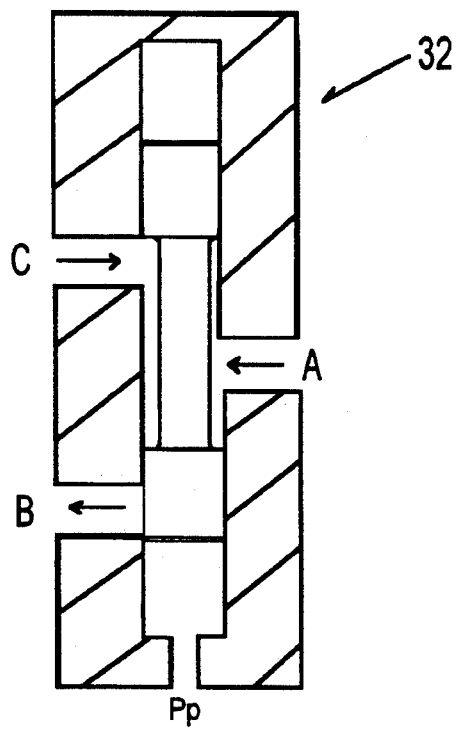
FIG. 4C shows operation of the control circuit valve to cause the disengagement of a wheel drive motor.

Once the sampled fluid pressure $P_p$ increases sufficiently to overcome the spring force F, the spool 38 fully shifts as shown in FIG. 4C. In this position port C opens on the forward side (low pressure) of the bidirectional pump 24. This position for the valve 36 allows low pressure fluid to circulate from one side of the bidirectional motor 24 to the other, while blocking port B which prevents high pressure fluid flow from the reverse side of the bidirectional pump 24.

The manner of operation of the control circuit 32 therefore avoids abrupt changes in fluid flow to the rear wheel drive motor 16. Such an abrupt fluid flow change would cause a momentary braking, or scuffing, action by the rear drive wheel 18. The occurrence of such a scuffing action can cause damage to the underlying surface, such as a manicured turf. In some instances such an abrupt scuffing action can surprise the driver who then operates the vehicle incorrectly; or the scuffing action can cause a reduction in vehicle speed at an inopportune moment, also surprising the driver. In addition it would be much more energy efficient to divert the power from the rear wheel drive motor 16 to the front wheel drive motor 12 for operating those drive wheels which have good traction. If the same vehicle is going forward or braking in reverse, the hydrostatic drive circuit 10 operates without need of the control circuit 32 under normal conditions of use (see FIG. 2B).

The control circuit 32 also can operate to engage selected wheel drive motors (which were disengaged) once traction has been reestablished as determined by the sensor 33 detecting appropriate pressures in the hydrostatic pressure lines 20, 22.

In another embodiment shown in FIG. 3, the control circuit 32 is used in each of two different circuits. This arrangement enables activation of the control circuit 32, 32' in either one of two different operating speeds. When the control circuit 32' is activated as in FIG. 3A (the valve therein is shifted), hydrostatic fluid normally flowing to the rear wheel drive motor 16 is diverted to the front wheel drive motors 12. Therefore, this increased fluid flow causes an increase in speed of the drive wheels 14. If the second control circuit 32' is not actuated (see FIG. 3B), fluid flow from the bidirectional pump 24 is shared by all the wheel drive motors 12 and 16, and the speed of the drive wheels decreases. Preferably, the second control circuit 32' is controlled by a sensor (or the operator of the vehicle) which is independent of the hydrostatic drive circuit 10. As shown in detail in FIG. 3A, when the second control circuit 32' is activated by signal 36 and the vehicle is operating in a forward drive mode, the hydrostatic fluid pressure is high on selected portions and low on other portions of the hydrostatic lines 20, 22. When the control circuits 32 and 32' are not operative, the fluid pressure is distributed as shown in FIG. 3B.

While preferred embodiments have been illustrated and described, it should be understood that changes and modifications can be made therein without departing from the invention in its broader aspects. Various features of the invention are defined in the following claims.

What is claimed is:

1. A hydrostatic drive circuit for delivering power to the drive wheels of an all wheel drive vehicle, said drive circuit comprising:

a front drive wheel motor having fluid inlet and outlet ports;

a read drive wheel motor having fluid inlet and outlet ports;

a pump having an output for providing at said output pressurized hydrostatic fluid;

a plurality of hydrostatic lines coupled to said output and said front and rear drive wheel motors for communicating the pressurized hydrostatic fluid to said front and rear drive wheel motors; and control valve means coupled to said hydrostatic lines and responsive to the traction delivered by said front and rear drive wheel motors for selectively decoupling said front and rear drive wheel motors from the pressurized hydrostatic fluid when the traction developed by said front or rear drive wheel motor falls below a predetermined minimum;

said control valve means further including common pressure means responsive to said decoupling of said front and rear drive wheel motors for communicating said fluid inlet port of said decoupled front or rear drive wheel motor with said fluid outlet port of said decoupled front or rear drive wheel motor so as to permit continued hydrostatic fluid flow through said decoupled front or rear drive wheel motor and so as to avoid abrupt torque transitions in said decoupled front or rear drive wheel motor as said decoupled front or rear drive wheel motor is decoupled from the pressurized hydrostatic fluid.

2. A hydrostatic drive circuit as defined in claim 1 wherein said control valve means responds to the traction developed by said front and rear drive wheel motors by sensing the pressure of the hydrostatic fluid in said hydrostatic lines coupled to said front and rear drive wheel motors.

3. A hydrostatic drive circuit as defined in claim 2 wherein said control valve means comprises a spool valve having an open center crossover.

4. A hydrostatic drive circuit as defined in claim 3 wherein said pump is a bidirectional pump and wherein said front and rear drive wheel motors are bidirectional motors.

5. A hydrostatic drive circuit as defined in claim 4 wherein hydrostatic pressure in said hydrostatic lines is sensed by means of a spring loaded valve.

* * * * *